March 16, 1943.  G. F. COLLEY  2,314,126
BATTERY TOOL
Filed June 17, 1941
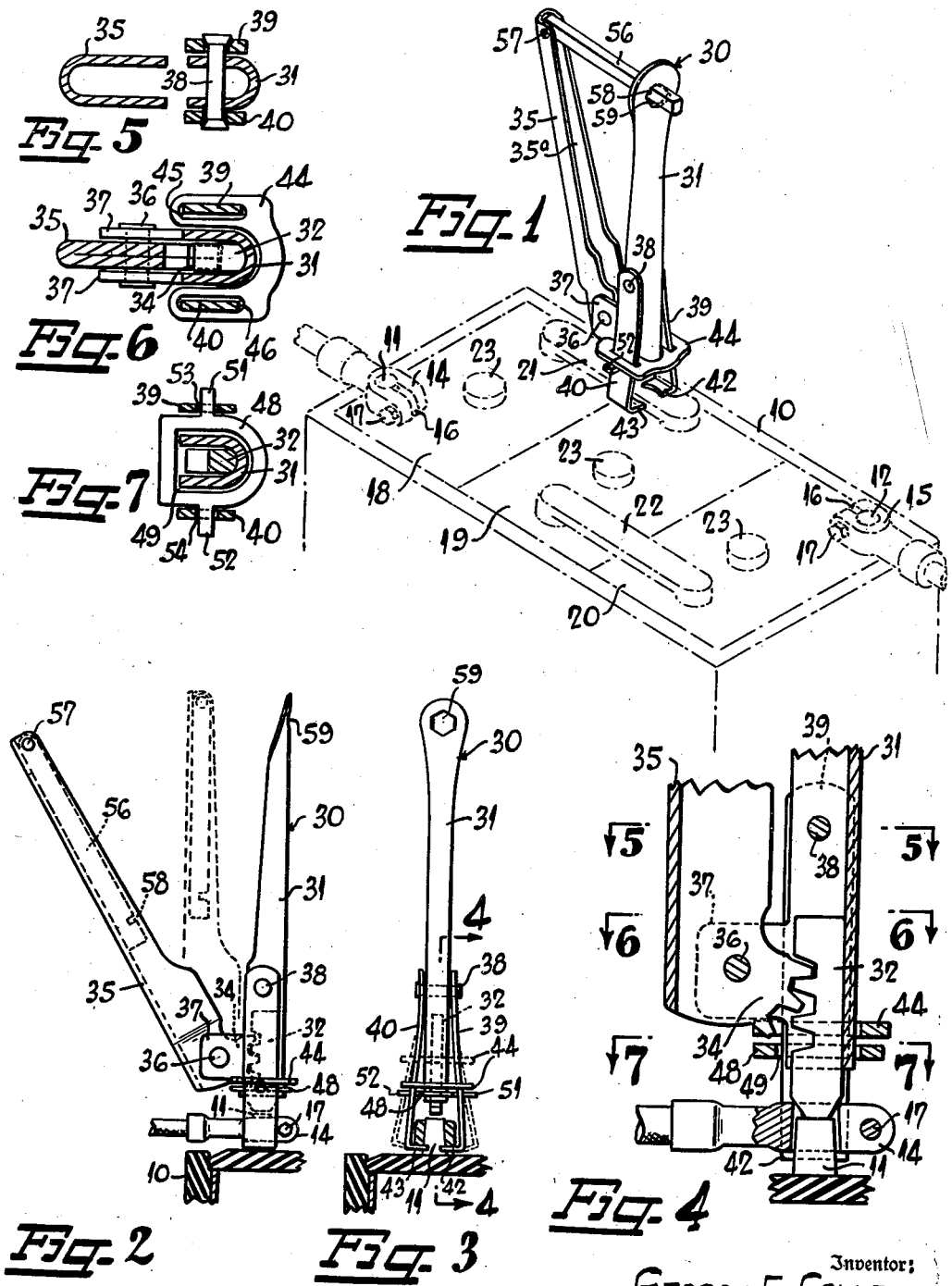
Inventor:
GEORGE F. COLLEY
Eaton & Brown
Attorney.

Patented Mar. 16, 1943

2,314,126

UNITED STATES PATENT OFFICE 2,314,126

BATTERY TOOL

George F. Colley, Winston-Salem, N. C., assignor of two-thirds to Nat S. Poindexter, Winston-Salem, N. C.

Application June 17, 1941, Serial No. 398,426

1 Claim. (Cl. 29—85)

This invention relates to a combination battery tool which is so constructed that it may be employed as a pushing and pulling instrument, as well as a carrying device.

It is a well known fact that the acid in ordinary storage batteries often causes the terminals to corrode, and thus makes it difficult to disconnect electrical connections therefrom. In many cases, these connections comprise members such as collars clamped around suitable terminal posts, which posts are disposed near each end of the battery. When corrosion takes place between the post and the collar, a bond is formed and when removing the collar, it is usually necessary to break the bond created by the corrosion and lift the collar from the post. The corrosion around the posts has a high acid content, which is capable of injuring one's hand; therefore, it is very desirable that bodily contact be avoided, as much as possible, when breaking this bond or when handling the battery.

It is, therefore, an object of this invention to provide a battery tool having elements for engaging the lower side of a terminal post collar to hold the same while other terminals are employed to push the top of the post axially therefrom to break the bond between the collar and the post.

It is another object of this invention to provide a battery tool of the class described with means for holding the above-mentioned pushing elements in an inoperative position, so that only the holding elements will be employed to engage portions of the battery to carry the same from place to place.

Some of the objects of the invention having been stated, other objects will appear as the description proceeds, when taken in connection with the accompanying drawing, in which—

Figure 1 is an isometric view of my improved battery tool showing the same as it appears when used as a carrier for a battery;

Figure 2 is a side elevation of the battery tool, showing the same when used as a means for disconnecting a conduit collar from a battery post terminal;

Figure 3 is an elevation, with certain portions thereof shown in section, looking at the right hand side of Figure 2;

Figure 4 is an enlarged vertical sectional detail view taken along the line 4—4 in Figure 3;

Figure 5 is a sectional detail plan view taken along the line 5—5 in Figure 4;

Figure 6 is a sectional detail plan view taken along the line 6—6 in Figure 4;

Figure 7 is a sectional detail plan view taken along the line 7—7 in Figure 4.

Referring more particularly to the drawing, the numeral 10 denotes in dot-dash lines (Figure 1) a portion of an ordinary storage battery, said battery having post terminals 11 and 12, upon which are mounted suitable collars 14 and 15 respectively. Each of the conduit collars are split as at 16 so the same may be easily inserted or removed from their respective posts. In order to clamp the split ends of the collars upon the post terminals, suitable bolts 16 are employed.

The battery illustrated in Figure 1 has three cells, namely 18, 19 and 20, the cells 18 and 19 being joined by a suitable conductor or strap member 21 and the cells 19 and 20, in turn, being connected to each other by a similar strap member 22. These strap members are usually made from suitable conductive material, whereby electrical current will be permitted to flow from one cell to another. In order to gain access to the interior of cells 18, 19 and 20, suitable removable cap members 23 are employed. When the caps are removed, water, acid and chemicals are admitted to form the necessary electrolytic solution. As heretofore stated, the acid and chemicals within the cells often overflows, resulting in a deposit forming between the collars 14 and 15 and their respective posts 11 and 12. When this deposit forms, the bond is much more secure between the members; therefore, the removal of the collars is very much more difficult. The present invention contemplates the easy removal of the collars from the posts with a minimum amount of bodily contact between the individual and the battery. Where bodily contact is made with the battery, the chemicals and acids often prove injurious.

In order to remove the conduit collars with a minimum of bodily contact, I provide a battery tool, broadly designated by the reference character 30, said battery tool comprising a U-shaped handle member 31. The lower end of the handle has slidably mounted therein a toothed rack member 32. Meshing with this toothed rack is a toothed gear segment 34 which gear segment forms an integral part of a second handle member 35. Handle member 35 is pivoted intermediate its ends as at 36 between lugs 38, extending from the U-shaped handle member 31.

Pivoted to handle 31, intermediate its ends upon rivet 38, are a pair of oppositely disposed strap members 39 and 40, said members extending downwardly and having inwardly and laterally projecting hook portions 42 and 43 integral therewith. The proximate edges of the portions 42 and 43 are preferably concave so that a close fit can be obtained between these portions and a convex member such as terminal post 11, thereby providing a greater bearing area between portions 42 and 43 and the lower face of collar 14. It is to be understood, however, that in removing a collar 14 from the terminal post 11, it is necessary for a sliding movement to take place between the proximate edges of portions 42 and 43 and the post.

It will also be seen by referring to Figures 3 and 5 that the lower ends of the strap members are capable of a slight pivotal movement toward and away from each other, due to the loose fit around the rivet 38. The strap members 39 and 40 flare outwardly from each other, as they progress downwardly (Figure 3). At a point intermediate the ends of the strap members, a suitable connecting means such as plate 44 is provided, said plate having slots 45 and 46 cut therein, into which intermediate portions of strap members 39 and 40 respectively are adapted to fit. Since the distance between the slots 45 and 46 is greater than the distance between the pivot points of the strap members, it is evident that as the plate member 44 is moved upwardly, the lower ends of the strap members 45 and 46 will spread apart from each other; whereas as the plate member is moved downwardly the lower ends of the strap members will move toward each other. In other words, the plate member serves to positively spread apart, or move toward each other, the lower ends of the members 45 and 46 and at the same time hold the free ends of the members in the desired positions.

In order to prevent the upper ends of the strap members 45 and 46 from rotating about the longitudinal center line of rivet 38, a second collar or plate 48 is provided (Figure 7). This plate has a hole 49 therein substantially of the same size and shape as the outer contour of handle member 31. Extending from opposed sides of the plate member 48 are projections 51 and 52 which penetrate holes 53 and 54 in the intermediate portions of downwardly and outwardly extending strap members 39 and 40 respectively. Projections 51 and 52 permit the free ends of members 45 and 46 to move laterally toward and away from each other, but prohibit any substantial rotative movement of the free ends of these members transversely to the above named lateral movement. Therefore, it is seen that the proximate ends of hook portions 42 and 43 are held in opposing relation to each other at all times.

When it is desired to use the tool 30 as a means for removing collar 14 from terminal post 11, it is first necessary to move the plate member 44 upwardly to dotted line position, such as shown in Figure 3, thereby spreading the lower free ends of strap members 45 and 46 to dotted line positions. Then the tool is lowered to a position where the projections 42 and 43 will be disposed on opposed sides of the post 11, after which the plate member 44 is lowered to bold line position to cause the projections 42 and 43 to move in close proximity to the periphery of the post. At this time, the lower end of the rack member 32 will be disposed directly above the terminal post 11 and the laterally extending portions 42 and 43 will be disposed below the collar 14. With the parts in this position, the handle 35 will be rotated from bold line to dotted line position (Figure 2), thereby causing the rack 32 to be moved downwardly while the hook members 42 and 43 engage the lower face of the collar 14, (Figure 3). This rotation will produce relative axial movement between the post 12 and the collar 14, thereby breaking the bond between the two members and permitting easy removal of the collar. Figure 4 is an enlarged view illustrating the positions of the parts after rack 32 has been moved downwardly to separate the collar 14 from the terminal post 11.

When it is desired to lock the rack 32 in an inoperative position, so that only the hook members 39 and 40 may be used, it is necessary to provide a third handle such as designated by the reference character 56, said handle being pivoted as at 57 to the upper free end of the second handle 35. The free end of the handle 56 is adapted to be retracted within the U-shaped recess 35a of the handle 35 when it is not desired to lock the rack 32 in an inoperative position (Figure 2). Also the free end of this third handle has a suitable notch 58 therein, said notch being adapted to fit over the upper edge of a hole 59 in the upper end of handle 31 when the third handle is rotated to a substantially horizontal position (Figure 1).

With the handle 56 in a substantially horizontal position, and with the notch 58 engaging the upper edge of hole 59, the handles 31 and 35 are held in opened or separated positions, and therefore, it is impossible for the rack 32 to be moved downwardly or to be otherwise actuated from handles 31 and 35. It is in this position that the tool 30 is usually employed as a carrying device; however, to do so, it is necessary to connect the lower end thereof to a portion of the battery 10.

Usually the lower ends of members 39 and 40 are separated to dotted line positions substantially as shown in Figure 3, and then the portions 42 and 43 are placed on opposed sides of a portion of the battery such as strap members 21. The plate member 44 is then moved downwardly to lock the opposed projecting portions 42 and 43 beneath the strap member 21. At this time, the operator may grasp the third handle 56 to lift the battery without any fear of the free ends of handles 31 and 35 collapsing or without fear of the rack 32 being actuated.

If desired, the hole 59 may be shaped so as to fit the perimeter of a bolt head or nut such as 17, thereby providing a wrench in combination with other features of the battery tool.

It is therefore seen that I have provided a simple and efficient combination battery tool which may be employed either as a carrying device or as a means for removing conduit collars from battery terminal posts. This device is simple in construction, low in manufacturing costs and very easily operated.

In the drawing and specification, there has been set forth a preferred embodiment of the invention, and although specific terms are employed, they are used in a generic and descriptive sense only and not for purposes of limitation, the scope of the invention being set forth in the following claim.

I claim:

A battery tool for separating a conduit collar from a terminal post of a battery, comprising an elongated rod-like handle, a pair of members loosely and pivotally secured at their upper ends to the lower portion of the handle for swinging movement towards and away from each other and having their lower ends extending inwardly towards each other for hooking beneath the collar, a loose plate having perforations therein for slidably receiving said handle and said pair of members whereby the plate can be slid downwardly on the pair of members to hold their hooked lower ends beneath the collar, a ring surrounding the handle and having oppositely directed pins, a hole in each of said pair of members for receiving each pin, said handle and ring being so constructed as to prevent rotation of the ring and likewise side motion of said members, a plunger slidably mounted in the handle and having a rack thereon and being disposed between said pair of members, a second handle having its lower end pivoted to the first handle and having a segment on its lower end for engaging said rack, whereby when the plate is slid downwardly on the pair of members and the free end of the pivoted handle is moved toward the first handle, the slidable plunger having the rack thereon will move downwardly relative to the pair of hooked members to press against the top of the terminal post to lift the collar therefrom.

GEORGE F. X COLLEY.
his mark

Witnesses to mark:
 BERTIE KETNER SPILLMAN,
 MILDRED BROWN SMITH.